May 6, 1947.  R. H. WHEMPNER  2,420,214
MANUAL CONTROL MECHANISM
Filed Oct. 14, 1942
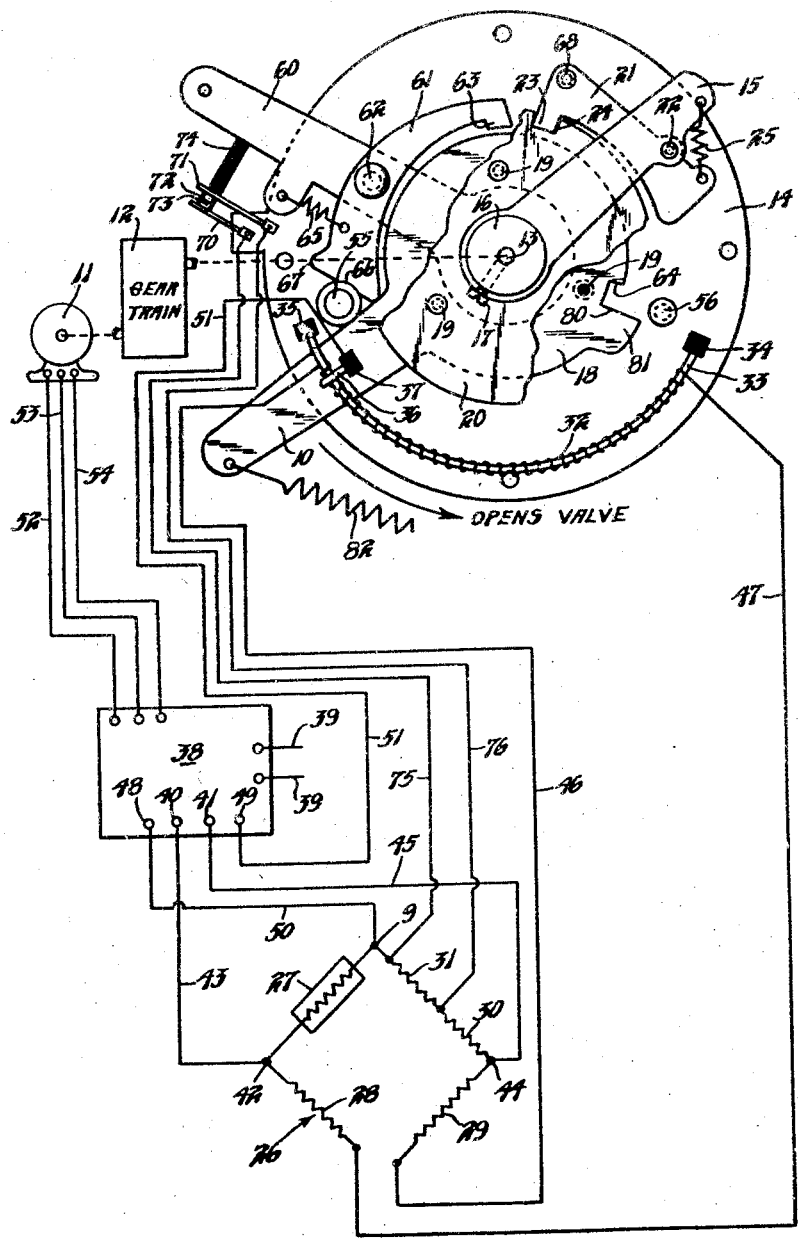
Inventor
RUSSELL H. WHEMPNER
By George H. Fisher
Attorney Patented May 6, 1947

2,420,214

UNITED STATES PATENT OFFICE 2,420,214

MANUAL CONTROL MECHANISM

Russell H. Whempner, Minneapolis, Minn., assignor to Minneapolis-Honeywell Regulator Company, Minneapolis, Minn., a corporation of Delaware Application October 14, 1942, Serial No. 461,954

12 Claims. (Cl. 236—1)

The present invention relates to the provision of manual means in conjunction with a device which is normally positioned by a power means, the manual means being so arranged that the device may be manually positioned entirely independently of the power means should occasion arise.

In systems of control where a device to be positioned is normally positioned by a power means, it is often desirable to provide an arrangement by which the device may be manually positioned entirely independently of the power means. For example, if the power means should be of the electrical type and become inoperative because of a failure of electrical power or for any other reason, the provision of such manual means makes it possible to nevertheless position the device to be controlled. Such an arrangement has particular utility in systems of automatic control used in aircraft and the like. The present invention is disclosed in connection with an aircraft temperature control system wherein the temperature changing means is automatically controlled through reversible electric motor means and an electronic amplifier. In the event of failure of electrical power or failure of the amplifier or any of the tubes therein, or for that matter failure from any cause of the automatic system of control, the present invention permits manual actuation of the temperature changing means completely independent of the automatic control system through a mechanical connection between the manual operator and the apparatus to be controlled and entirely independently of the reversible electrical motor power means.

Although the invention is disclosed in connection with temperature control of the interior of the aircraft, it will readily be seen that it is equally applicable to temperature control of the engines or to the control of other working and operating parts of the aircraft wherein it might well be disastrous if the automatic control system failed and there were no means of taking over control manually.

Furthermore, in view of the large number of things which the pilot of an aircraft has to do, it is highly desirable that the manual control means be as simple and fool-proof as possible and require a minimum number of operations to place the manual control means in control of the mechanism to be positioned and thereafter to return control to the automatic system.

It therefore follows that one of the objects of the present invention is the provision, in a power operated remote control system, of manual means by which the apparatus to be positioned may be operatively disconnected from the power means for such device, then positioned by the manual means as desired and to later operate to disconnect the manual means and again place the device to be positioned under the control of the power means.

It is a further object of the present invention to provide a single manual operator which may be operated to disconnect the power means from a device to be positioned, to then position the device manually in any of the positions to which it can normally be driven by the power means, and finally to disconnect the manual means and reconnect the power means to the device.

Another object of the invention is the provision of manual disconnecting and positioning means for a device that is normally positioned by a power means, together with means for driving the power means to a predetermined position upon its disconnection and provided it is in operative condition, the power means automatically being recoupled to the device to be positioned when moved to such predetermined position upon placing of the manual means in a selected position. In other words, it is an object of this invention to provide a system of the type described wherein placing of the manual means in a selected position automatically causes the power means to resume control of the device to be controlled provided the power means is in operating condition.

Another object of the present invention is the provision of a single manual operator for a device that is normally positioned by power means, which manual operator has a normal inactive position and which, upon movement out of said normal inactive position takes over control of the device to be positioned and retains such control until the manual operator is moved back to the normal inactive position, whereupon the control of the device to be positioned is automatically returned to the power means provided the power means is in operating condition.

Additional objects of the invention will become clear upon a reading of the following description and appended claims in connection with the single drawing wherein an apparatus illustrative of my invention is shown applied to an automatic system of temperature control for an aircraft.

Turning now to the single figure of the drawing, a device or arm 10 may be considered as the apparatus to be positioned. This arm 10 is normally positioned by an electric motor 11 under the control of a suitable control system. The electric motor 11 is suitably connected to a reducing gear train 12 which in turn drives a final driven shaft 13. The shaft 13 is indicated as being journalled in a base plate 14, only one of which is shown for purposes of clarity. It will be understood, however, that the shaft 13 will be provided with a suitable number of bearings. Further, the gear train 12 and motor 11 in actual construction can conveniently be mounted on the underside of the base plate 14 so that the complete mechanism constitutes a unitary self-contained structure. A driving arm 15 is secured to a hub 16 that is in turn secured to the shaft 13 by a set screw 17.

The driven arm 10 constitutes an extension of a substantially circular plate 18 which is in turn secured, as by rivets 19, to a substantially circular plate 20. These integral plates 20 and 18 are journalled on or concentrically with shaft 13 but are free to rotate independently of such shaft. In order to show certain of the other parts to be later described, the plate 20 has been broken away.

Under normal conditions, the driving arm 15 is coupled or clutched to the driven arm 10. To this end a driving latch 21 is pivoted on the driving arm 15 by a pin 22. This driving latch 21 is provided with a latching portion 23 that is normally engaged in a notch 24 formed in the plate 20. A spring 25, which has one end secured to the driving arm 15 and its other end secured to the driving latch 21, normally biases the latching portion 23 of the driving latch 21 in such a direction as to cause it to enter the notch 24.

It should now be readily apparent that with the parts thus far described in the positions shown movements of the electric motor 11 are directly transmitted to the driven arm 10 through the driving arm 15 and associated driving latch 21.

The motor 11 may be controlled in any desired manner, either manually or automatically and is herein shown as controlled in accordance with temperature variations. The temperature responsive means is here shown as the well-known temperature responsive resistance 27 which is of the usual type in that its resistance increases on temperature rise. This temperature sensitive resistance 27 comprises one arm of a bridge circuit 26. A second arm of the bridge circuit includes a fixed resistance 28 and a third arm of the bridge circuit includes a similar fixed resistance 29. The fourth and last arm of the bridge circuit includes a fixed resistance 30 in series with a fixed resistance 31 that is normally shunted in a manner which will be described hereinafter. Therefore, for the present purposes the bridge circuit may be considered as comprising three arms having similar resistances 28, 29 and 30 therein and a fourth arm having the temperature sensitive resistance 27 therein.

The arms 28 and 29 further include variable portions of a balancing or follow-up resistance. This resistance is shown as a coiled wire 32 which is wound upon a rod of insulating material or the like 33 having an arcuate configuration. One end of the rod 33 is secured to the base plate 14 by a fastening means 34. Similarly, the other end of the rod 33 is secured to the base plate 14 by a fastening means 35. This balancing resistance 32 lies in front of the driven arm 10. A slider contact 36, which is secured to a piece of insulating material 37 in turn carried by the driven arm 10, is adapted to slide along the resistance 32.

Variations in the bridge circuit 26 are transformed into movements of the electrical motor 11 through the medium of an electronic amplifier 38. This electronic amplifier preferably takes the form disclosed in Figure 1 of the application of Albert P. Upton, Serial No. 437,561, filed April 3, 1942. The electronic amplifier is furnished with any suitable source of alternating current as indicated by the wires 39. The amplifier 38 is provided with a pair of power supply terminals 40 and 41 for the bridge 26. The terminal 40 is connected to a bridge input terminal 42 which connects those arms of the bridge containing the temperature sensitive resistance 27 and the fixed resistance 28, by means of a wire 43. Similarly, the terminal 41 is connected to a bridge input terminal 44 formed by the junction of those arms containing the fixed resistances 29 and 30, by means of a wire 45. The lower end of the fixed resistance 28 is connected to the right-hand end of balancing resistance 32 by a wire 47, and the lower end of resistance 29 is connected to the left-hand end of balancing resistance 32 by a wire 46. The amplifier 38 is further provided with a pair of amplifier input terminals 48 and 49. The terminal 48 is connected to an output terminal 9 of the bridge 26 which in turn forms the junction of those arms containing the temperature sensitive resistance 27 and the fixed resistance 30. This connection is made by means of wire 50. The terminal 49 is connected to the slider contact 36, which forms the second bridge output terminal, by a wire 51. The motor 11 is of the split phase type and driving power is furnished thereto by the electronic amplifier 38 through the wires 52, 53 and 54.

The split phase motor 11 is, of course, provided with the usual two windings. One of these windings is constantly energized. The other winding is deenergized when the bridge is balanced. However, upon unbalancing of the bridge in one direction, the second motor winding is energized with a current having a leading phase in respect to the constantly energized winding. This causes motor rotation in one direction. When the bridge is unbalanced in the opposite direction, the second winding of the split phase motor 11 is energized with a current having a lagging phase in respect to that which energizes the constantly energized winding. This causes rotation of motor 11 in the opposite direction. All this is accomplished by the electronic amplifier 38 and the means by which this is accomplished is thoroughly described in the Upton application heretofore referred to. Of course, any other known system for obtaining reverse movements of motor 11 upon changes in temperature may be utilized.

The driven arm 10 may be used to position any desired device or apparatus and in an aircraft temperature control system might position, for example, a heat controlling valve or damper. With the parts in the position shown, the driven arm 10 is engaging a stop 55 and is therefore in one of its extreme positions. In this extreme position, the valve or damper of the heat controlling system is so positioned that no heat is being supplied to the aircraft. The temperature within the aircraft is at or above the desired maximum. Assuming that the temperature in the aircraft falls below the desired maximum, the resistance of temperature sensitive resistance 27 decreases. This causes an unbalance in the bridge circuit 26 that in turn is transmitted to the electronic amplifier 38. Such unbalance in the bridge circuit causes the second winding of motor 11 to be energized with a current having such a phase in respect to the constantly energized winding of the motor 11 that the arm 10 is driven in a counter-clockwise direction to move the heat controlling valve towards open position. Such movement of the driven arm 10 moves slider 36 along the balancing resistance 32 towards its right-hand end. When the driven arm 10 and therefore the heat control valve reach such a position that the movement of slider 36 along balancing resistance 32 has rebalanced the bridge circuit, the electronic amplifier 38 will deenergize the second winding of motor 11, whereupon rotation of such motor will cease. The heat controlling valve has thus been partially opened as a result of the fall in temperature. If further temperature fall should occur in the aircraft, the driven arm 10 will move further in a counter-clockwise direction. When the minimum desired temperature in the aircraft is reached, the arm 10 will have been moved to its other extreme position wherein it engages a stop pin 56 carried by the base plate 14. In this position, the contact slider 36 will be at the extreme right-hand end of balancing resistance 32 in order to rebalance the bridge circuit 26 and the heat control valve is fully open.

Similarly, upon a subsequent temperature rise, the resistance of temperature sensitive resistance 27 will increase. This will unbalance the bridge circuit 26 in the opposite direction whereupon the electronic amplifier 38 will energize the second winding of motor 11 with a current of opposite phase whereby the motor 11 will rotate in the opposite direction. The driven arm 10 will therefore rotate in a clockwise direction and carry with it slider 36 which, in cooperation with balancing resistance 32, will rebalance the bridge circuit to cause deenergization of the second winding of the motor 11. Such movement operates the heat control valve towards closed position.

From the foregoing, it will be clear that the driven arm 10 and therefore the heat control valve are normally automatically graduatingly positioned in accordance with the temperature condition to which the temperature sensitive resistance 27 responds.

The apparatus thus far described may become inoperative for any number of reasons. Under such conditions, it is highly desirable that the heat control valve can be manually positioned entirely independently of the power driving means. To this end, a manual operator 60 is provided which is journalled on or concentrically with the shaft 13. This manual operator 60, as shown, lies directly in back of the plate 18 of which the driven arm 10 is an extension. The manual operator 60 has a manual latch 61 pivoted thereon at 62. The manual latch 61 is provided with a latching portion 63 that is adapted to engage a notch 64 formed in the plate 18. A biasing spring 65, having one end secured to the manual latch 61 and its other end secured to the manual operator 60, biases the manual latch 61 in such direction that the latching portion 63 engages the periphery of the plate 18 and enters the notch 64 when brought into registry therewith. Moreover, the opposite end of the manual latch 61 is provided with a cam surface 66 which engages the stop 55 when the manual operator is in the extreme position shown. Under such conditions, the latching portion 63 of the manual latch 61 is retracted, as shown, against the bias of spring 65. The manual latch 61 is further provided with a cam portion 67. This cam portion 67 cooperates, under certain conditions, with a pin 68 carried by and extending backwardly from the driving latch 21.

Whenever it is desired to operate the driven arm 10 manually and to prevent its actuation by the power means 11, the manual operator 60 is moved in a clockwise direction. Initial movement of the manual operator 60 removes the cam surface 66 from the stop pin 55, whereupon spring 65 moves the latching portion 63 of the manual latch 61 into engagement with the circular periphery of the plate 18. Upon further clockwise movement of manual operator 60 to an extent determined by the position of the driven arm 10 at the time manual control is desired, the cam 67 will ride under the pin 68 and lift the latching portion 23 of the driving latch 21 out of the notch 24 in plate 20. At the same instant, the latching portion 63 of the manual latch 61 will be pulled into the notch 64 by the biasing spring 65. The driven arm 10 is thus disconnected from the driving arm 15 and is connected to the manual operator 60. The amount of movement of manual operator 60 necessary to accomplish this declutching of the driving arm 15 and clutching of the manual operator 60 will depend upon the position of driven arm 10 at the time it is desired to take manual control. However, by moving manual operator 60 throughout its full range of movement, just once, the operator will be assured that such uncoupling and coupling action has been accomplished. Thereafter, he may position the manual operator 60 in any desired position and the driven arm 10 will assume a similar position. In such positioning of the manual operator 60, the notch 24 may again pass under the latching portion 23 of the driving latch 21. But no re-engagement of the parts can take place under the bias of spring 25 since the cam 67 will again engage the pin 68 and prevent movement of the latching portion 23 into the notch 24.

In order to return control of the driven arm 10 to the motor 11, it is necessary to unlatch the manual operator 60 and relatch the driving latch 21. It will of course be understood that these various latches will be inaccessible in a complete assembly which will include the usual housing or covering members. Therefore, the only way of unlatching the manual latch 61 is to return the manual operator 60 to the position shown wherein the coaction of cam surface 66 with stop pin 55 retracts the latching portion 63 of the manual latch 61, as shown in the drawing. When such retracting action takes place the notch 24 in the plate 20 which is secured to the driven arm 10 will be quite near the stop 55. There is no assurance however that the latching portion 23 of the driving latch 21 will be in registry with the notch 24 at such time. Means is therefore provided to automatically drive the arm 15 and therefore the latch 21 to a predetermined position whenever the manual operator 60 is moved out of its normal inactive position in which it is shown, provided of course that the motor 11 is operative.

In the particular embodiment herein disclosed, this automatic positioning of these parts in a predetermined position is accomplished by unbalancing the bridge circuit 26. It will be remembered that the one arm of the bridge circuit 36 includes the fixed resistance 31 which was said to be normally shorted. This resistance 31 is normally shorted by a switch comprising switch arms 70 and 71 secured to the base plate 14. The switch arm 71 is biased in a direction to disengage its contact 72 from the cooperating contact 73 carried by the switch arm 70. Normally, such disengagement is prevented when the manual operator 60 is in its normal or inactive position. This may be accomplished, for example, by providing the manual operator 60 with a pin 74 of insulating material that engages the switch arm 71 and forces contact 72 into engagement with contact 73 when the manual operator 60 is in its normal or inactive position. With these contacts closed, there is a shunt circuit about the resistance 31 comprised by wire 75, switch arm 70, contact 73, contact 72, switch arm 71, and wire 76. Upon initial movement of manual operator 60 out of its normal or inactive position then, not only does the cam surface 66 move away from stop pin 55 but in addition the pin 74 moves away from switch arm 71 permitting contact 72 to separate from contact 73. This removes the shunt around resistance 31 so that this resistance is then included in that arm of the bridge circuit which includes the fixed resistance 30. Increasing the resistance of this arm has the same effect as a decrease in resistance of the temperature sensitive resistance 27. In other words, it has the same effect as a fall in temperature on the automatic control system. The resistance 31 is made large enough so that removal of the shunt will demand that the driving arm 15 move to its extreme position, regardless of the actual temperature, wherein the driven arm 10 should engage stop pin 56 and the heat control valve would be wide open if these parts were latched together. This means that if the automatic control system is operative upon movement of manual operator 60 out of its inactive or normal position, the motor 11 will drive the arm 15 counter-clockwise to its opposite extreme position wherein the notch 24 of plate 20 will be in registry with the latching portion 23 of latch 21 when the manual operator 60 has been returned to its normal or inactive position wherein the latching portion 63 of the manual latch 61 is in its retracted position. If the automatic control system is inoperative at the time that manual operator 60 is initially moved out of its inactive position, the arm 15 will remain in whatever position it was at such time. Under these conditions, no automatic recoupling of the automatic mechanism to the driven arm 10 can take place regardless of the position to which the manual operator 60 is moved. However, just as soon as the automatic control system becomes operative and so long as the manual operator 60 is out of its inactive position, the arm 15 and driving latch 21 will be moved to the extreme position wherein it is ready for automatic relatching upon return of the manual operator 60 to its inactive position.

From the foregoing it will be evident that the single manual operator 60 is operative to perform a number of functions in a fool-proof manner. So long as it remains in its normal or inactive position, the driven arm 10 is under the control of the motor 11 and the automatic system of control. Then, upon a full movement of the manual operator 60 to its other extreme position, the driving latch 21 will be disengaged and the manual latch 61 will be engaged irrespective of the position of the driven arm 10 at such time. Thereafter, the manual operator 60 may be placed in any desired position except the extreme position shown, and moved as often and as far as desired and the driven arm 10 will assume a corresponding position. However, when the automatic control system again becomes operative, the motor means 11 will drive the driving arm 15 to such position that automatic recoupling of the driving arm 15 to the driven arm 10 will take place when the manual operator 60 is next moved back to its normal inactive position as shown. Even though the automatic control system has become operative again so that the arm 15 is in its opposite extreme position ready for automatic recoupling, and even though such automatic recoupling takes place by movement of the manual operator 60 to the position shown, if it is still desired to have manual control, subsequent movement of the manual operator 60 out of its inactive position will again unlatch the driving latch 21 by the passage of cam 67 under pin 68 and the manual operator will pick up the driven arm 10 since the right-hand end of latch member 61 will engage the surface 80 provided by the extension 81 of the plate 18.

It should be noted that a biasing spring 82 has been shown indicating that the driven arm 10 is biased towards the stop pin 56. This is for the following reasons. If the manual arm 10 were biased in the opposite direction and the manual operator 60 were moved to the position shown while the driven arm 10 is being controlled manually, the driven arm 10 under such conditions would be engaging the stop pin 56. At this time, the latch portion 63 would be retracted due to the engagement of cam surface 66 with stop pin 55. Under such conditions, neither the manual operator 60 nor the driving arm 15 would be coupled to the driven arm 10. The driven arm 10 therefore if provided with the opposite bias would be moved clear over into engagement with stop pin 55 although the manual operator 60 is in the position demanding that the driven arm 10 be in engagement with stop pin 56. For this reason, a bias should be applied to the driven arm 10 in the direction indicated or the driven arm 10 should have no bias on it whatsoever.

From the foregoing, it will be seen that I have provided a novel mechanism whereby a device that is normally positioned through a power means may be positioned manually entirely independently of such power means. Furthermore, I have provided such a mechanism which is especially valuable in connection with aircraft or the like where dependability, simplicity, and a minimum number of operations are desirable so that the apparatus is fool-proof and manual control can be taken over substantially instantaneously with the minimum number of operations. It will further be apparent that while I have disclosed my invention in connection with the control of temperature in an aircraft, it is equally well useable in any situation where it is desired to take over manual control independently of the power means of any device that is normally operated by the power means, whether such power means operation is automatic or otherwise. Furthermore, the particular type of power means employed and the manner in which the power means is controlled is relatively unimportant in so far as the basic features of my invention are concerned. Many changes and modifications will occur to those skilled in the art without departing from the spirit of my invention, and I therefore intend to be limited only by the scope of the claims appended hereto.

I claim as my invention:

1. In a temperature control system, in combination, a variably positionable member for changing a temperature condition, a power operator therefor normally operable to position said member in a plurality of different positions, temperature responsive means in control of said power operator to cause it to position said member in said plurality of different positions upon change in temperature, a manual operator having an inactive stationary position, means operable thereby to position said member in a plurality of positions independently of said power operator, said member remaining in any position to which it is moved by said manual operator, and means operable as an incident to movement of said manual operator out of its normal position to additionally control said power operator to render said power operator incapable of positioning said member in said plurality of positions upon said change in temperature.

2. In a positioning apparatus, in combination, a member to be positioned, a power operator to position said member, a manual operator having a normal stationary position in which it remains during operation of said member by said power operator, means operable upon movement of said manual operator out of its normal stationary position to position said member and to prevent further positioning of said member by said power operator, means to return control of said member to said power operator only when said power operator and manual operator are in predetermined positions, and means operable as an incident to movement of said manual operator out of said normal stationary position to cause movement of said power operator to said predetermined position.

3. In a positioning apparatus, in combination, a member to be positioned, a power operator to position said member, a manual operator having a normal stationary position in which it remains during operation of said member by said power operator, means operable upon movement of said manual operator out of its normal stationary position to position said member and to prevent further positioning of said member by said power operator, means to return control of said member to said power operator only when said power operator is in a predetermined position and said manual operator is returned to its normal stationary position whereby manual control of said member can be maintained so long as said manual member is not returned to said normal stationary position, and means operable as an incident to movement of said manual operator out of said normal stationary position to move said power operator to said predetermined position.

4. In a positioning apparatus, in combination, a member to be positioned, a power operator to position said member, a manual operator having a normal stationary position in which it remains during operation of said member by said power operator, means operable upon movement of said manual operator out of its normal stationary position to position said member and to prevent further positioning of said member by said power operator, means to return control of said member to said power operator only when said power operator is in one of its extreme positions and said manual operator is returned to its normal stationary position whereby manual control of said member can be maintained so long as said manual member is not returned to said normal stationary position, and means operable as an incident to movement of said manual operator out of said normal stationary position to move said power operator to said extreme position.

5. In a positioning apparatus, in combination, a member to be positioned, a power operator to position said member, a manual operator having a normal stationary position in which it remains during operation of said member by said power operator, means operable upon movement of said manual operator out of its normal stationary position to position said member and to prevent further positioning of said member by said power operator, means to return control of said member to said power operator only when said power operator is in a position such as to normally place said member in a position corresponding to the position it is moved to by said manual operator when the manual operator is controlling said member and is moved to its normal stationary position, and means operable as an incident to movement of said manual operator out of its normal position to cause movement of said power operator to said position.

6. In a positioning system, electric motor means, an electrical network in control of said motor means, control means operable on said network to cause motor operation, a member to be positioned driven by said motor means, electrical means actuated by said member and cooperating with said network to stop motor operation when said member reaches a position commensurate with the condition of said control means, a manual operator, and means operable thereby to prevent further positioning of said member by said motor means, to cause positioning of said member by said manual operator, and to influence said network in a manner to drive said motor means to a predetermined position.

7. In combination, a member to be positioned, a power operator, a pivoted manual operator movable in a single plane and having a normal stationary position, clutching means normally clutching said power operator to said member, means operable upon movement of said manual operator about its pivot out of its normal stationary position to declutch said member from said power operator and to clutch it to said manual operator in a predetermined relationship for positioning thereby upon movements thereof about its pivot after said declutching and clutching actions have taken place, the position of said manual operator thereafter indicating the position of said member, and means associated with said manual operator to cause declutching thereof and reclutching of said power operator.

8. In combination, a member to be positioned, a power operator, a manual operator having a normal stationary position, clutching means normally clutching said power operator to said member, means operable upon movement of said manual operator out of its normal stationary position to declutch said member from said power operator and to clutch it to said manual operator for positioning thereby upon movements thereof after said declutching and clutching actions have taken place, means for reclutching said member to said power operator, said means being effective only upon return of said manual operator to its normal stationary position and movement of said power operator to a predetermined position, and means to so position said power operator automatically as a result of declutching of said power operator from said member.

9. In a positioning system, in combination, a member to be positioned in a plurality of positions, a power operator therefor operable to position said member in a plurality of positions, means to control said power operator to position said member in a plurality of positions, a manual operator movable to a plurality of positions, clutch means operable to connect said manual operator to said member to be positioned only in a predetermined relation whereby the position of said manual operator when clutched to said member to be positioned indicates the position of said member, and means operable upon movement of said manual operator from a predetermined position to prevent further positioning of said member by said power operator until said manual operator is returned to said predetermined position.

10. In a device of the class described, a member to be positioned, power means for positioning said member, manual means having a normal predetermined position, clutch means for connecting said manual means to said member only in a predetermined relationship whereby the position of said manual means thereafter indicates the position of said member, and means operable as an incident to movement of said manual means out of said normal predetermined position to influence subsequent operation of said power means.

11. In a positioning mechanism, in combination, a device to be positioned, reversible electric motor means connectable thereto for positioning the same, manual means movable to a plurality of positions connectable to said device for positioning the same, and connecting means for selectively and independently connecting either said manual means or said reversible motor means to said device, said connecting means including mechanically interengaging portions by which said manual means and device can only be connected together in a predetermined relationship such that each one of the plurality of positions to which said manual means may be moved indicates the position of said device regardless of the position of said device at the time said manual means was connected thereto.

12. In a positioning mechanism, in combination, a device to be positioned in a plurality of positions and arranged to remain in any position to which it is moved, reversible electric motor means connectable to said device for driving the same back and forth to position it in a plurality of positions, electrical means to control said reversible electric motor means, manual means movable in a graduated manner over a limited range commensurate with the desired movement of said device, and connecting means for selectively and independently connecting either said manual means or said reversible motor means to said device, said connecting means including mechanically interengaging members for connecting said manual means and said device in a predetermined relationship such that the position of said manual means in its limited range of movement during manual operation positively indicates the position of said device regardless of the position of said device at the time said manual means was connected thereto.

RUSSELL H. WHEMPNER.

REFERENCES CITED

The following references are of record in the file of this patent:

UNITED STATES PATENTS

| Number | Name | Date |
|---|---|---|
| 2,169,696 | Hotchkiss | Aug. 15, 1939 |
| 1,665,227 | Smith | Apr. 10, 1928 |
| 2,096,251 | Knight | Oct. 19, 1937 |
| 2,286,597 | Bruckel | June 16, 1942 |
| 2,238,739 | Jarvis | Apr. 15, 1941 |
| 2,086,030 | Hodgson et al. | July 6, 1937 |
| 1,820,756 | McWhirter | Aug. 25, 1931 |
| 1,930,722 | McWhirter | Oct. 17, 1933 |
| 2,025,542 | Lugar | Dec. 24, 1935 |
| 2,300,576 | Klein | Nov. 3, 1942 |
| 1,889,022 | Little | Nov. 29, 1932 |
| 2,319,842 | Benson et al. | May 25, 1943 |
| 2,208,453 | Forstrom | July 16, 1940 |
| 2,286,597 | Parish | June 16, 1942 |